United States Patent [19]

Hiteshue

[11] 4,053,184

[45] Oct. 11, 1977

[54] SOLIDS TRANSFER METHOD

[75] Inventor: Raymond W. Hiteshue, Bedford, Pa.

[73] Assignee: Cities Service Company, Tulsa, Okla.

[21] Appl. No.: 600,326

[22] Filed: July 30, 1975

[51] Int. Cl.$^2$ ............................................. B65G 53/30
[52] U.S. Cl. ....................................... 302/66; 210/84; 302/15; 302/16
[58] Field of Search ............................. 302/14–16, 302/22, 25, 35, 40, 51, 52, 57, 66; 209/162, 164, 173; 210/83, 84, 538, 540

[56] References Cited

U.S. PATENT DOCUMENTS

| 1,598,558 | 8/1926 | Cohen | 302/15 |
| 2,110,760 | 3/1938 | De Vooys | 209/173 |
| 2,509,122 | 5/1950 | Wolfson | 302/15 |
| 3,081,880 | 3/1963 | Hearne et al. | 210/84 |
| 3,504,945 | 4/1970 | Leibundgut et al. | 302/51 |

FOREIGN PATENT DOCUMENTS

| 430,463 | 6/1926 | Germany | 302/52 |
| 7,263 | 5/1915 | United Kingdom | 302/52 |
| 800,877 | 9/1958 | United Kingdom | 302/22 |

Primary Examiner—John J. Love
Assistant Examiner—Jeffrey V. Nase
Attorney, Agent, or Firm—Richard S. Strickler; Donald L. Traut

[57] ABSTRACT

A method or process for transferring finely divided solids from a first location under the influence of atmospheric pressure to a second location under the influence of pressures of the order of 500 to 10,000 psi.

2 Claims, 1 Drawing Figure

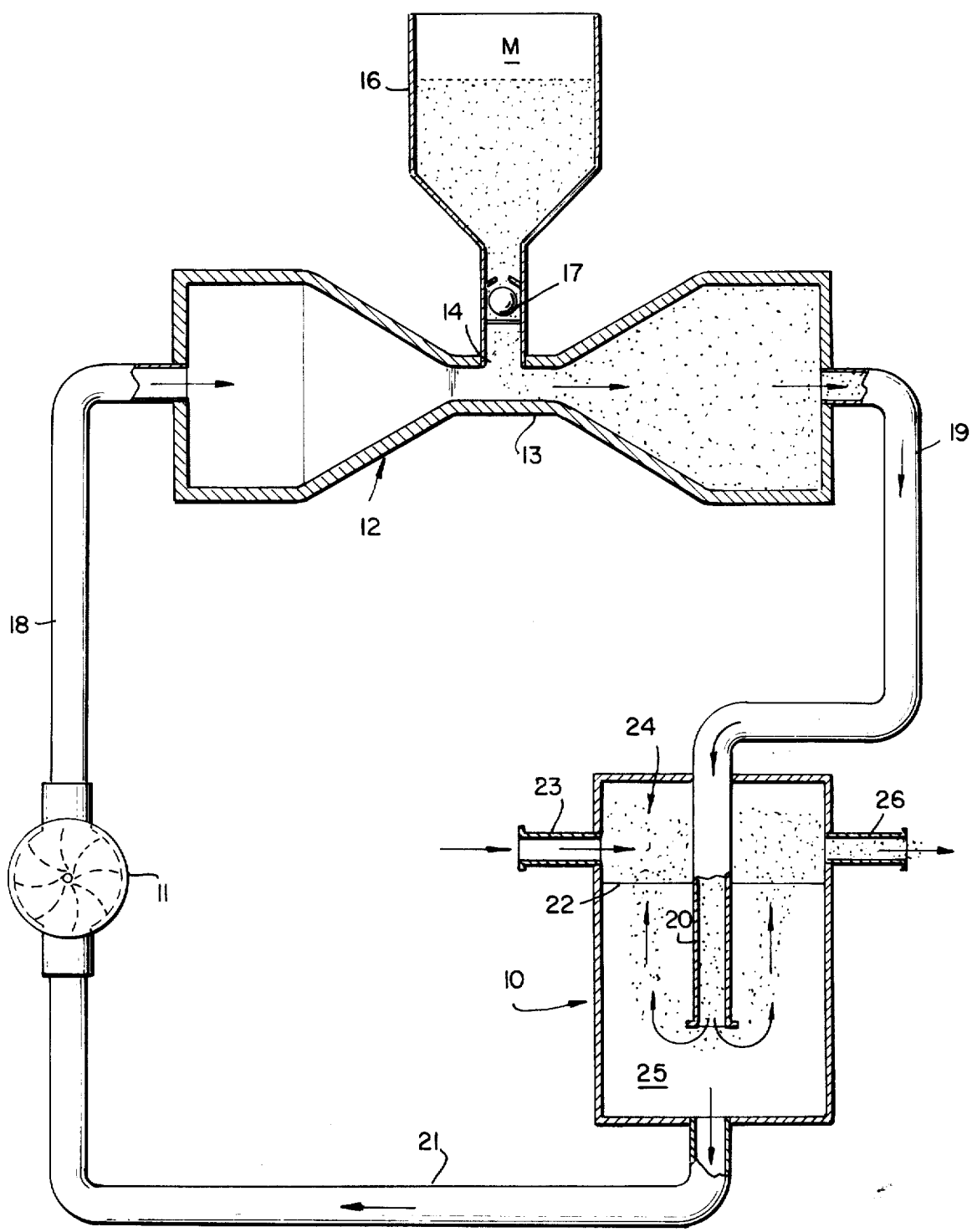

SOLIDS TRANSFER METHOD

BACKGROUND OF THE INVENTION

The present invention relates to material handling and relates in particular to a process for transferring finely divided solids such as coal from a receptacle under atmospheric pressure into a system or reactor under high pressure, i.e., of the order of 500 to 10,000 psi.

Therefore, a special feature of the invention is the provision of the process which is operable to introduce dry solids into a high pressure reaction system.

A further feature of the invention is the provision of a process of the type described in which a solids carrier is utilized and the carrier is readily separable from the solids.

A further feature of the invention is the use of a dense carrier having a specific gravity, higher than the specific gravity of the solids, so that the solids will readily float on the carrier.

A further feature of the invention is the use of a carrier which when in the fluid condition is immiscible relative to finely divided solids.

Prior art devices and processes utilized to introduce solids held under atmospheric pressure into high pressure systems or high pressure reactors usually require complicated air locks or pressurized hoppers to effect the transfer.

Frequently, the size and capital cost of such air locks limit the pressure levels at which material transfers can be made. For example, if it is intended to introduce material normally under atmospheric pressure into a system at 5,000 psi, a series of air locks are usually required, each stepping down in volume and each incrementally increasing in pressure level as the material is moved sequentially from the larger air lock or hopper to the next smaller air lock and ultimately into the reaction system.

Furthermore, in prior art material handling processes, series air locks used to reach high pressure levels have to be stepped down in volume as pressure levels are stepped up in order to insure containment of pressure at the higher levels.

In contrast, the process of the present invention contemplates a single unit of small size, capable of making a material transfer from atmospheric pressure to a receptacle under pressures as high as 10,000 psi in a single step.

In the present process, if a high feed rate is desired, it is merely necessary to provide a plurality of process units, each feeding the same system or reactor.

SUMMARY OF THE INVENTION

A process embracing certain features of the present invention may comprise the steps of placing a high pressure pump in circuit with a Venturi tube having a throat, introducing an immiscible fluid carrier having a high density into the circuit under pressure, maintaining a negative pressure at the Venturi throat by appropriately sizing the cross-sectional area of the throat relative to the carrier pumping rate, introducing finely divided solids of less density than said carrier into the Venturi at said throat whereby the negative pressure at the throat siphons the finely divided solids onto the carrier, permitting said solids to float on the carrier and thereafter sweeping the solids from the surface of the carrier.

BRIEF DESCRIPTION OF THE DRAWINGS

Other features and advantages of the present invention will become more apparent from an examination of the succeeding specification when read in conjunction with the appended drawing, in which;

The single FIGURE shows, schematically, an apparatus operable to practice the process of the present invention.

DETAILED DESCRIPTION OF THE INVENTION

This invention takes advantage of the well known concept referred to as the Venturi principle or Venturi tube, wherein a fluid that is not compressible can be pumped through a restriction or throat with very high static inlet and outlet pressures and with virtually zero or negative pressure at the Venturi throat. For example, if in directing fluid flow through a Venturi, such as is disclosed in FIG. 1, one has appropriately designed cross-sectional area at the throat, static pressure at the inlet may be as high as 5,000 psi with a pressure drop to virtually zero psi at the throat with the static pressure recovering to as high as 4,500 psi at the outlet of the Venturi. Thus, at a given flow rate, it is possible to control pressure drop at the Venturi throat by very high increments by appropriately designing the cross-sectional area of the Venturi in accordance with well known principles.

The reference numeral 10 designates a separator in circuit with a recycle pump 11 communicating with a Venturi tube 12, in turn in circuit with the separator.

The throat 13 of the Venturi is formed with an opening 14 which provides an inlet for finely divided solid material such as coal retained at atmospheric pressure in hopper 16. The hopper communicates with the interior of throat 13 past check valve 17 and through opening 14.

As will be more apparent hereinafter, check valve 17 is provided to prevent carrier fluid from spurting out of the Venturi in the event the negative or low pressure at throat 13 suddenly becomes positive or high because of pump failure or like occurrence.

The units just described are maintained in circuit with one another by means of conduits 18, 19 and 21.

A high density carrier, such as mercury or Wood's Metal, having a melting point of the order of 160° F. is introduced into the circuit defined by the conduits 18, 19 and 21. Preferably, the carrier should be of greater density than the density of the finely divided solid material being transferred and should be immiscible relative to the solid material.

In order to take full advantage of the different densities between the carrier and the solids, whereby the solids float and remain dry on the surface of the carrier, the separator 10 receives extension 20 of conduit 19, below the surface 22 of the reservoir of carrier fluid indicated by numeral 25.

The separator is provided with an inlet 23 connected to a source of high pressure fluid, such as an inert or a reactive gas, to sweep or blow dry solids, indicated by reference numeral 24, from the surface of the carrier through discharge opening 26 into a reactor or other system attachment.

The process unit illustrated, is operable to practice the process of the present invention in the following fashion:

Assume that the hopper 16 is filled with finely divided solid material such as coal under atmospheric pressure and that the fluid circuit is charged with Wood's Metal and retained at a temperature to maintain fluidity in the reservoir of separator 10 and throughout the circuit.

Pump 11 is operated to deliver carrier fluid to Venturi 12 at an inlet pressure selected from the range of 500 to 10,000 psi. The flow rate and the cross-sectional area of Venturi throat 13 are so selected and designed to generate a pressure level in throat 13 which is less than atmospheric pressure. Suitable agitation or vibration of finely divided coal retained in the hopper 16 will cause the finely divided coal to be siphoned into the circuit onto the carrier for transfer into the separator. It is to be understood that the agitation or vibration step is optional because the pressure drop at the Venturi throat will draft solids from the hopper at an acceptable rate.

In the separator, the finely divided coal, borne by the carrier is directed to a point below the surface 22 of the reservoir of carrier material, encouraging the less dense coal to flow to the surface as indicated by reference numeral 24, where it is available as a finely divided dry solid.

When it is desired to remove solids such as coal continuously, a continuous jet of gas at high pressure is introduced through inlet 23 with the result that dry coal is swept or blown from the surface of carrier 22 into a reactor or other system unit through discharge opening 26.

Thereafter, the carrier is recycled through pump 11 and the sequence just described is repeated in continuous fashion to effect continuous transfer of finely divided coal under atmospheric pressure into a high pressure system.

In the event pump 11 fails or is shut down, loss of velocity of carrier through the Venturi throat 13 will cause a pressure buildup in the throat. Upon this occurrence, check valve 17 operates to close and prevent carrier fluid from entering the hopper 16.

It is anticipated that a number of modifications and design changes may be devised in the apparatus and fluid circuit without departing from the spirit and scope of the present invention.

What is claimed is:

1. A method of introducing finely divided coal into a circulating liquid pressure system where the finely divided coal is retained at atmospheric pressure and the system is under a pressure of at least 10 atmospheres, comprising the steps of introducing a Venturi tube, said tube having a throat of predetermined cross-section in the liquid system, pressurizing the system with a liquid flow so as to generate a negative pressure in the Venturi tube, providing an inlet port at the Venturi throat, introducing finely divided coal into the throat through said port so that negative pressure at the throat operates to siphon finely divided coal into the system, wherein the liquid is a dense liquid having a density greater than the density of coal and immissible relative to the coal maintaining the system at a temperature sufficiently high to keep said dense liquid in a liquid state, transporting the coal and dense liquid to a separation chamber, separating the coal from the dense liquid while in said separation chamber by flotation, sweeping the coal from the separation chamber by a gaseous fluid into a reactor and recirculating said dense liquid.

2. The process of claim 1 wherein said dense liquid is Wood's Metal.

* * * * *